Nov. 27, 1962 L. S. HOLMBOE 3,065,984
SHORE CLAMP
Original Filed May 3, 1951
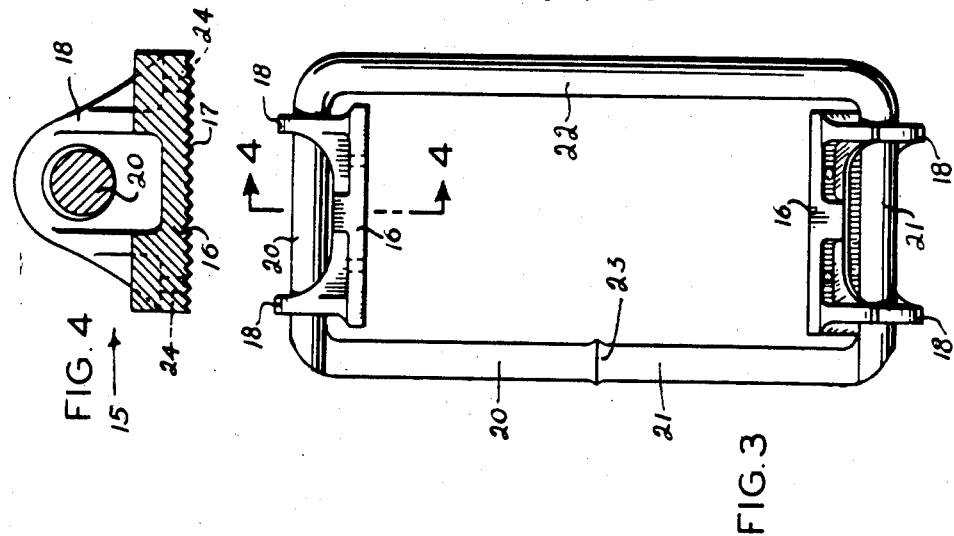
FIG. 4
FIG. 3
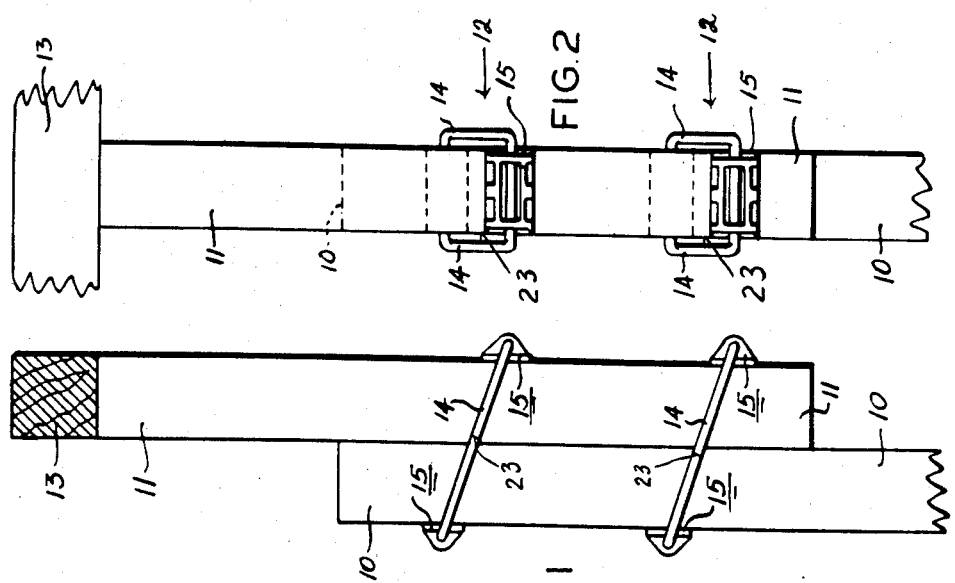
FIG. 2
FIG. 1
Inventor
Lawrence S. Holmboe
By Leech and Radue
Attorneys 3,065,984
SHORE CLAMP
Lawrence S. Holmboe, 211 NW. 4th St.,
Oklahoma City 3, Okla.
Original application May 3, 1951, Ser. No. 224,273, now Patent No. 2,724,890, dated Nov. 29, 1955. Divided and this application Aug. 4, 1955, Ser. No. 526,442
2 Claims. (Cl. 287—103)

The present invention relates generally to building construction, and more particularly to form shoring, scaffold and tower erection, or other types of temporary frame erection needed during the construction of a building.

The present invention is an improvement over United States patent numbered 1,932,072, which was issued to me on October 24, 1933, and a division of my co-pending allowed application Serial No. 224,273, filed May 3, 1951, on which Patent 2,724,890 was issued to me on November 29, 1955.

The principal object of the present invention is to provide an improved stirrup or clamp for retaining two vertical shore members in side to side overlapped relation, so that the two members may complementally act as a single weight supporting post. The device, disclosed and claimed in the above mentioned patent, is formed out of an endless substantially rectangular metal loop or collar, each end portion of which pivotally supports a shore engaging shoe or plate. In manufacturing and assembling the loop and plates a problem arises in getting the plates in proper position, and then closing the loop and making it endless.

The assembly was originally accomplished by forming two identical substantially U-shaped elements out of rod-stock, inserting the ends of the elements through the ears of two clamping members so that the similarly located ends of the elements face each other in close proximity, and then welding the adjacent ends of the elements together to form a closed loop. That method was found impractical, because the proximity of the clamping members to the two welds would cause the member to draw the heat from the rod-stock and result in an imperfect weld-integration of the abutted ends. It was further found difficult to hold the U-shaped members in proper alignment during the welding operation.

The clamp of the present invention is designed for assembly in a manner which precludes the possibility of any mismating, and in such a manner that only one welded joint is needed. This single weld joint is so located that longitudinal stresses exerted in use on the sides of the loop will place the joint under tension instead of exerting a prying force thereon.

Other objects will be apparent from the following description when taken in conjunction with the accompanying single sheet of drawings, wherein:

FIG. 1 is a side elevational view of two shore timbers which are anchored together by two clamps of the present invention;

FIG. 2 is an elevational view of the timbers shown in FIG. 1, but looking at the right hand face thereof;

FIG. 3 is an enlarged side elevational view of one of the shore clamps showing the loop member completely formed; and FIG. 4 is a vertical sectional view taken substantially along the line 4—4 of FIG. 3.

Like characters of reference designate like parts in those figures of the drawings in which they occur.

The clamp of the present invention is illustrated in FIGS. 1 to 4 inclusive of the drawing, wherein:

The reference numeral 10 indicates a lower or bottom shore member or timber which in cross-section is preferably four inches square. The reference numeral 11 indicates an upper or top shore member or timber of similar cross-sectional dimensions.

The clamp of the present invention is indicated as a whole by the reference numeral 12, and is designed to hold the two shore members 10 and 11 in flat face to face contact with each other, and to anchor the shore member 11 against downward longitudinal movement with relation to the lower shore member 10. When thus anchored together, the two members 10 and 11 complementally act to form a post for supporting any weight or load 13.

The clamps 12 of the present invention, per se, are each composed of a substantially rectangular loop 14, made of steel rod material, and two clamping plates or shoes 15 pivotally carried by the end extents of the loop 14.

The two shoes 15 are identical, and each one is composed of a rectangular metal body 16 having an elongated, flat serrated bearing surface 17, and an opposite back surface which is provided with two spaced apart upstanding ears 18 which are parallel to each other, and which are alignedly perforated transversely.

In forming the rectangular loop 14 with the shoes 15 confined upon the end extents thereof, a single piece of steel rod material is first bent to form a substantially square cornered U-member. The U-member thus formed provides two parallel leg portions 20 and 21 and a connecting portion 22. The connecting portion 22 is of a length to properly form one side of the finished loop 14, and the two leg portions are each of a length equal substantially to the length of one end of the loop 14, plus one-half the length of the loop's other side.

With the U-member thus formed, one leg is inserted through the ears 18 of one of the shoes 15, and the other leg is similarly inserted through the ears of the other shoe 15. The two shoes are then moved or slid along their respective legs to points adjacent the connecting portion 22, as shown in FIG. 3. With the shoes thus positioned, the free end portions of the legs are bent toward each other for welding together into axial alignment so as to form the other side of the loop 14. FIG. 3 depicts the final positions of said free end portions. The bending operation brings the two planar leg ends into confronting substantially abutting relation, and they are thereupon welded together as indicated by a weld line 23.

The shore clamp of the present invention functions in a manner similar to that of my former patent. The two shore members 10 and 11 are merely inserted side by side into the loops of two of the clamps 12, as best illustrated in FIG. 1. The serrated faces 17 of the shoes 15 are placed against the outer side surfaces of the shore members, and frictionally engage said surfaces to prevent downward movement of the upper timber 11 along the lower timber 10.

The shoe bodies 16 are provided with through perforations 24 through which nails may be inserted to attach one of the shoes to one of the timbers.

Obviously the invention is susceptible to some change or alteration without defeating its practicability, and I therefore do not wish to be confined to the preferred embodiment shown in the drawings and described herein, further than I am limited by the scope of the appended claims.

Having thus described my invention, what I claim as novel and desire to secure by Letters Patent of the United States is:

1. A shore clamp consisting of a metal rod of substantially uniform cross-section formed into an elongated rectangle having a pair of long legs and a pair of short legs, the endmost surfaces of said rod being planar and disposed in confronting substantially abutting relation intermediate the length of one of said long legs, a weld integrally joining said endmost surfaces in their abutting relation, and an elongated metal clamping shoe having a flat bearing surface and a pair of parallel, outwardly projecting, alignedly perforated ears disposed oppositely to its bearing surface pivotally mounted by said ears on each short leg of said rectangle.

2. A shore clamp comprising a metal rod of substantially uniform cross-section formed into an elongated rectangle having a pair of long legs and a pair of short legs, the endmost surfaces of said rod being coplanar and disposed in substantially abutting relation intermediate the length of one of said long legs, a weld integrally joining said end surfaces, and an elongated clamping shoe having a flat bearing surface and a pair of parallel, outwardly projecting, alignedly perforated ears disposed oppositely to its bearing surface pivotally mounted by said ears on each short leg of said rectangle.

References Cited in the file of this patent
UNITED STATES PATENTS

| | | |
|---|---|---|
| 661,891 | Parker | Nov. 13, 1900 |
| 1,932,072 | Holmboe | Oct. 24, 1933 |
| 2,724,890 | Holmboe | Nov. 29, 1955 |
| 2,737,363 | Horst | Mar. 6, 1956 |